Sept. 4, 1951 A. N. GOLDSMITH 2,566,700

STEREOSCOPIC AND STEREOSONIC TELEVISION SYSTEM

Filed Oct. 30, 1946 3 Sheets-Sheet 1

INVENTOR
Alfred N. Goldsmith
BY W. S. [signature]
ATTORNEY

Sept. 4, 1951 A. N. GOLDSMITH 2,566,700

STEREOSCOPIC AND STEREOSONIC TELEVISION SYSTEM

Filed Oct. 30, 1946 3 Sheets-Sheet 2

INVENTOR
Alfred N. Goldsmith
BY H. S. Grover.
ATTORNEY

Sept. 4, 1951 A. N. GOLDSMITH 2,566,700

STEREOSCOPIC AND STEREOSONIC TELEVISION SYSTEM

Filed Oct. 30, 1946 3 Sheets-Sheet 3

INVENTOR
Alfred N. Goldsmith
BY H. G. Grover
ATTORNEY

Patented Sept. 4, 1951

2,566,700

UNITED STATES PATENT OFFICE 2,566,700

STEREOSCOPIC AND STEREOSONIC TELEVISION SYSTEM

Alfred N. Goldsmith, New York, N. Y., assignor to Radio Corporation of America, New York, N. Y., a corporation of Delaware Application October 30, 1946, Serial No. 706,673

5 Claims. (Cl. 178—6.5)

This invention relates to stereoscopic motion picture systems and film strips for use therein, and more particularly to stereoscopic and stereosonic systems and films particularly adapted to television.

A stereoscopic system produces a three-dimensional optical representation of an object being photographed. This can be accomplished by preserving the identity of the right eye and left eye views and reproducing them in a manner such that the right eye and left eye of an observer sees only their respective images. This may be referred to as preserving the identity of the "eye-ness" of the image.

By providing a film strip having separate right and left eye images and projecting the images of the film strip in such a manner that the right and left eye of an observer sees only the proper images, a stereoscopic motion picture system can be provided.

A stereoscopic television system can also be provided by properly segregating the right and left eye images maintaining the "eye-ness" during image signal transmission and reproducing them at the receiver.

A process which may be used for the reproduction of stereoscopic television images is the so-called parallax stereogram which has been used for the reproduction of still images. In this method, the right-eye and left-eye views of a given scene are printed respectively in interlaced vertical lines of equal width, and there is placed at a suitable distance in front of the resulting composite pictures a line screen, having vertical black lines separated by their own width and substantially equal in number to the number of interlaced image lines forming the main image. It is not necessary to go into further details concerning this well known process except to state that, in its television application, a simple method for utilizing it appears to be to use vertical scanning of the image, with interlacing on successive images, and to send right-eye images and left-eye images alternately. Thus, a right-eye image might be sent with vertical scanning lines 1, 3, 5, 7 and so on, while the left-eye images might then be sent with vertical scanning lines 2, 4, 6, 8 and so on; after which the process is repeated. Thus, in accordance with present standards, there would be sent each second 30 right-eye and 30 left-eye interlaced images, each of the images being of half detail but blending into a substantially full-detail image in the brain of the observer. An appropriate line screen is then placed in front of the television receiving screen and the image is viewed at such a distance that the right eye of the observer sees only right-eye images, the screen lines obscuring left-eye images from the view of the right eye, and sees only left-eye images with his left eye, the lines of the screen obscuring the right-eye images from the view of the left eye.

In the following, this particular method of stereoscopic television will be used as illustrative, but it is to be understood that any other method of stereoscopic television requiring the rapid transmission of right-eye and left-eye views may alternatively be used and fall within the scope of this invention. Such well-known methods involve, for example, differentiation between the left eye and the right eye images by producing them in lights of complementary colors or in lights of mutually perpendicularly plane polarized nature.

If it is desired to produce 60 images per second for use in interlaced television transmission, each of two cameras can be arranged to produce 30 images per second, one camera for the right eye images and one camera for the left eye images, each camera running at half the normal speed of a monocular system.

The exposure of each camera will preferably be displaced from the exposure of the other camera by one-half cycle or 1/60 of a second.

If intermittent projectors are used, the same relationship between film motion, shutter action, or any other intermittent element in each of the cameras shall be observed, that is, one camera shall preferably have its exposure during 1/60 of a second, while the other camera will have its exposure during the succeeding time interval of 1/60 of a second.

In the case of the non-intermittent camera, there is, of course, no shutter action, and both cameras are taking pictures simultaneously with a half cycle or 1/60 of a second separation.

Stereosonic sound reproduction can also be had in the practice of this invention. Stereosonic sound may be described as a mobile source of sound following the action so that, as a speaker moves across the field of view, the sound appears in some measure to follow him. This can be accomplished by providing two sound pick-up microphones, one microphone representative of what the left ear would hear, and the other microphone representative of what the right ear would hear, and preserving such identity upon reproduction of the image. This may be referred to as preserving the identity of the "ear-ness" of the sound.

A primary object of this invention is to provide an improved stereoscopic motion picture system.

Another object of this invention is to provide an improved film strip for stereoscopic motion picture systems.

Still another object of this invention is to provide an improved film strip for use in the reproduction of stereoscopic television images.

A further object of this invention is to provide any of the foregoing, together with an assembly of thereto related stereosonic sound tracks.

A still further object of this invention is to provide an improved stereoscopic television system.

Still another object is to provide a stereoscopic television system with associated stereosonic sound.

Other and incidental objects of the invention will be apparent to those skilled in the art from a reading of the following specification and an inspection of the accompanying drawing in which Figure 1 shows schematically a portion of two film strips each of which is representative of the right or left eye view of the object being photographed;

Figure 1:
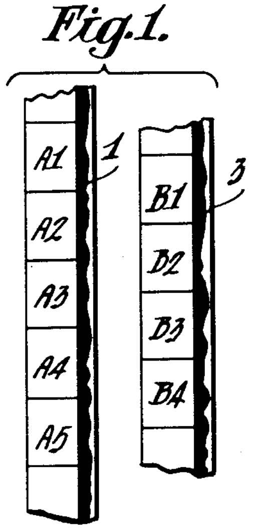

Turning now to Figure 1, there is illustrated a pair of film strips having images $A_1$ and $A_2$, and so on, representative of the left eye view and images $B_1$ and $B_2$, and so on, representative of the right eye view. It will be noticed that they are positioned one half-cycle apart.

Stereosonic sound may also be carried on the film strips, as indicated by sound tracks 1 and 3.

Figure 2:
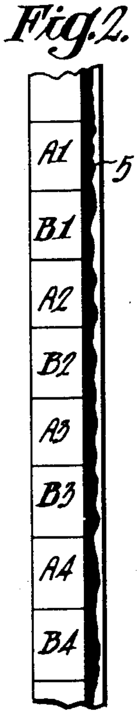
Figure 2 shows schematically the images on the separate film strips shown in Figure 1 combined and printed on a single strip.

The film strips containing image series A and B may be combined in a single film strip, as illustrated in Figure 2. According to a preferred form of this invention, images of series A and B are alternated along the film strip. One of the sound tracks 1 or 3 of Figure 1 may then be printed on the film strip shown in Figure 2 along the margin 15.

It will be seen that the film strip shown in Figure 2 is twice the length of the film strips shown in Figure 1. The sound track may be optically printed on the strip shown in Figure 2 by using a suitable cylindrical lens with its directrices perpendicular to the direction of the motion of the film and magnifying the sound track linearly in the ratio of 2 to 1 in the direction of the film motion in the printer, but not necessarily magnifying it at all in the other and perpendicular direction.

Figure 3:
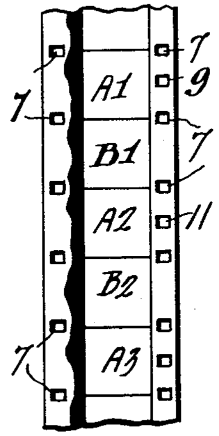
Figure 3 shows one preferred form of this invention.

In the use of film positives of the form shown in Figure 2, it is clear that these must be threaded into the projector so that the "eye-ness" of the images will be preserved. This may be accomplished by projecting the right-eye images at such times or in such a manner that will result in only right-eye viewing and likewise with the left eye images. If this were not done, instead of stereoscopic effects with objects standing out in three dimensions, there would be obtained pseudoscopic images reversed in three dimensions. That is, intaglio images, so to speak, would be received instead of images in relief. To avoid this difficulty automatically, and to insure proper threading, it is proposed that the film bearing the steroscopic images as in Figure 2 should be provided with regular perforations only on one set of alternate frames as shown in Figure 3. These might be, for example, the right-eye frames. The regular perforations in this case would be positioned at 7. Additional perforations could be added at 9 and 11. The sprockets on the film drive mechanism should be suitably modified to correspond with this type of perforation. The film for the right-eye camera and the sprockets for the right-eye camera might be indicially and correspondingly perforated for each frame, as would be the printer sprocket for the right-eye negative. The positive-carrying sprocket in the printer and in the projector would be indicially perforated on alternate frames as shown in Figure 3.

Additional realism may be added to the system by including stereosonic sound in the system and preserving the "ear-ness" of the sound.

Two partially directional microphones are used over the action, one picking up sound originating predominantly in the lefthand portion of the action, and the other picking up sound originating predominantly in the righthand portion of the action.

Figure 4:
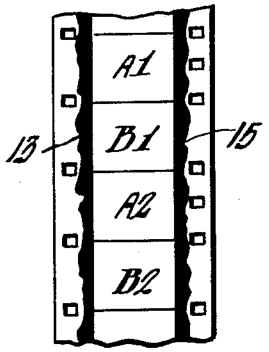
Figure 4 shows schematically another form of this invention.

The sound originating in the left hand portion of the action is recorded or printed at 13 on the left side of the film strip shown in Figure 4, and the sound picked up in the righthand portion of the action is recorded at 15 on the right side of the film strip.

Figure 5:
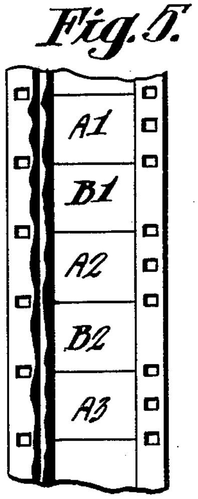
Figure 5 shows schematically still another preferred form of this invention.

In Figure 5 there is shown another form of double-sound-track film strip. In Figure 4 the sound tracks 13 and 15 are respectively to the right and left of the picture area; whereas in Figure 5 they are both to one side of the picture area. Optical and mechanical considerations will control the selection of the form of film strip in practice.

For the transmission of stereosonic sound in a television system, there is added a second sound channel, the carrier frequency of which may be either closely adjacent to the first sound channel or may be otherwise located as desired. One of these sound channels carries the right-side sound; the other carries the left-side sound.

At the receiver the two sound channels are separated by conventional radio methods, which may take the form of intermediate frequency selection by heterodyning, and after suitable demodulation and amplification, are carried respectively to a right-side loud speaker, and a left-side loud speaker. These speakers are located to the right and left of the receiving set respectively, with such separations and angular placements as will maximize the apparent separation of these sources of sound consistent with practicable dimensions of the receiver cabinet.

From the foregoing it will be seen that the sound will apparently follow the three dimensional action on the television screen.

Figure 6:
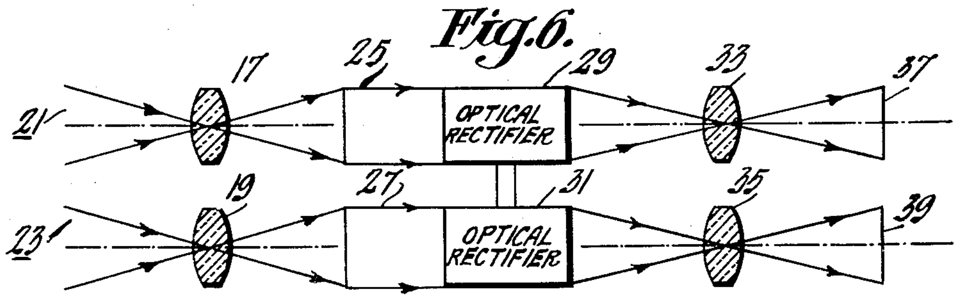
Figure 6 illustrates schematically one system of non-intermittent cameras for making the stereoscopic motion picture images required for use in the practice of this invention.

In Figure 6 there is shown schematically a non-intermittent camera for making stereoscopic negatives. An intermittent camera could equally well be used except for optical quality, exposure speed, and depth of field obtainable therein. In principle either form of camera is usable, although the non-intermittent camera is preferred. 17 and 19 are two objectives with substantially parallel optical axes 21 and 23 respectively. These objectives are separated by approximately the inter-ocular distance unless reduced or exaggerated stereoscopic effects are desired. Light passing through such objectives may be brought to a focus at aerial image gates 25 and 27 respectively, and pass therefrom through the two optical rectifiers 29 and 31 respectively, which may be any of the types well known in the art.

An optical rectifier is a device which systematically causes a real image to move in a direction parallel to and at the same velocity as a moving photographically sensitive surface, such as a film strip. As a result, it becomes possible sharply to photograph the image upon the film strip without interrupting film motion. Such devices are used in contra-distinction to intermittent flashing of the optical images on the film which, during the image illumination period, has been briefly brought to a stop and which has moved forward by approximately the height of the image during a period that image light is occulted from the film.

Optical rectifiers are well known in the art, and exist in many forms, such as glass plates of square, hexagonal, octagonal, or polygonal contour. Optical rectifiers may also be in the form of lens wheels in which a multiplicity of lenses of identical optical characteristics are mounted equally distant from each other and equally distant from the periphery of a rotating wheel, and are caused to intercept the image-forming light beam in such fashion as to cause the image to move appropriately upon the film with a velocity identical to that of the movement of the film.

The rectified right-eye and left-eye images pass through the auxiliary lenses 33 and 35 and are brought to a focus on the moving films 37 and 39 respectively. The exact height of the film gate need not be here considered. The view shown in Figure 6 is, of course, a plan view from above. 17 is the right-eye objective and 19 the left-eye objective.

Figure 7:
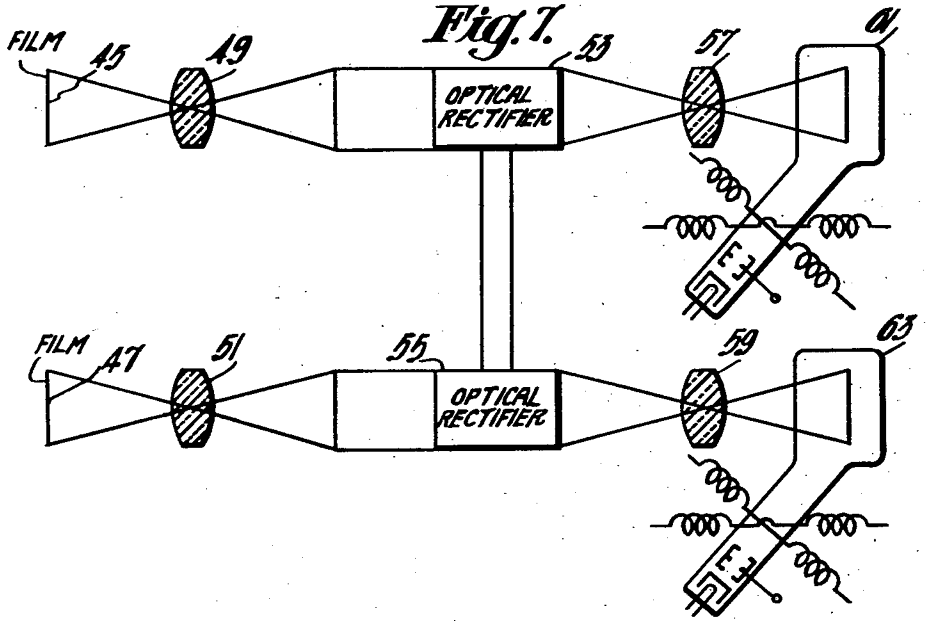
Figure 7 shows schematically another preferred form of this invention employed for the reproduction of stereoscopic television images.

Turning now to Figure 7, there is shown one preferred form of television stereoscopic image pickup device.

Film strips 45 and 47 may be of the type shown in Figure 1 or may be, for example, a combined image film strip such as illustrated in Figures 4 or 5. In the latter example, wherein the film strip takes the form of that illustrated in Figure 4 or Figure 5, the positions of the film gates may be positioned adjacent in order that the "eyeness" of the images may be maintained.

Lenses 49 and 51 focus the stereoscopic images on optical rectifiers 53 and 55, which may be of the type shown and described in Figure 6 as optical rectifiers 29 and 31.

Lenses 57 and 59 then focus the stereoscopic images on the transmitter pickup tubes 61 and 63.

The camera tubes 61 and 63 are illustrated as iconoscopes, but may be of any of the well-known types such as the orthicon or the image orthicon.

The iconoscope is well described in detail in an article entitled "Theory and Performance of the Iconoscope," by V. K. Zworykin, G. A. Morton, and L. E. Flory, beginning on page 1071 in the "Proceedings of the Institute of Radio Engineers" for August, 1937. A television camera of the image orthicon type is shown and described by R. D. Kell and G. C. Sziklai in "RCA Review" for March 1946. Further reference to a tube of this variety may be found in an article by A. Rose and H. Iams in "Proceedings of the Institute of Radio Engineers" for September 1939, which article is entitled "Television Pickup Tubes Using Low Velocity Beam Scannings," on pages 547–555. In the particular form of the invention illustrated, the direction of scanning is vertical.

Figure 8:
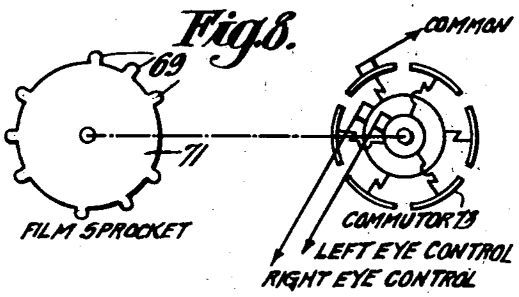
Figure 8 shows diagrammatically one preferred form of film drive sprocket and electric switch employed in the practice of one form of this invention.

In order to drive a film strip having perforations of the type shown and described under Figures 3, 4 and 5, it is necessary to have a film drive sprocket whose teeth are spaced only partially regularly about the film drive sprocket circumference and positioned in a manner to correspond with the perforations on the film strip. There is such a film drive sprocket shown in Figure 8. Teeth 69 are positioned about the circumference 71 of the film sprocket to correspond, for example, with the perforations 7, 9 and 11 of the film strip illustrated in Figure 3. The film drive sprocket illustrated in Figure 8 is positioned at a known and preferably short distance from the associated film gate. The short distance may, for example, be only several frames.

There is also shown in Figure 8 and attached mechanically to the film drive sprocket an electrical commutator 73 which may take the form of a mechanical or electronic switching device.

Commutator 73 is employed as a control to insure the "eye-ness" of the images throughout the system.

The commutator 73 may, for example, be interconnected with the element of the television transmission system which selects and provides odd line or even line scanning. In effect, the result of the commutator 73 is to insure, for example, that all the images produced by the odd lines in the scanning raster are representative of the right eye image, and all the left eye images are scanned with the even lines at all times.

The operation of commutator 73 is believed clear from the drawing contained in Figure 8, and will be understood after reference to the position of the right and left eye images along the film strip. For example, one compelte revolution of the film sprocket shown in Figure 8 will require the changing from right eye to left eye images and back to right eye images three times. The six separate segments of commutator 73 will therefore provide the six separate switchings required for this operation with each complete revolution of the film drive sprocket.

It will be seen that, in order to maintain the "eye-ness" of the image, it will be necessary at the receiving station to reproduce the left eye image in a manner such that only the left eye is permitted to view it, and similarly reproduce the right eye image in a manner such that only the right eye is permitted to view it. It has been suggested above that the well known procedures may be employed, such as maintaining the "eye-ness" throughout the transmission of the video signals by identifying one eye image as an odd line scanning and the other eye image as an even line scanning. The signals may be converted to images at the receiver and the "eye-ness" maintained by providing the stereogram screen correctly and corerspondingly placed in a permanent manner such that undesired pseudoscopic effects will automatically be avoided.

If the well known polarized light methods of stereoscopic reproduction are employed, similar conventions are directly applicable. "Eye-ness" identifying special signals such as the color-phasing signals of well known types may be employed for proper phasing of the stereoscopic images. Such special signals, however, are not required in a preferred form of this invention, wherein each of the odd line and even line scanning is representative of predetermined right or left eye images.

If, however, odd line scanning at the transmitter does not automatically and invariably lead to corresponding odd line scanning at the receiver, there must be provided at the transmitter a special signal corresponding to the odd line scannings. This can be of the type used for color phasing. At the receiver, it will be necessary to provide a signal selector which controls the scanning operation in such a manner that the odd line scanning commences upon the reception of the special signal and therefore will correspond with the odd line scanning at the transmitting station.

Figure 9:
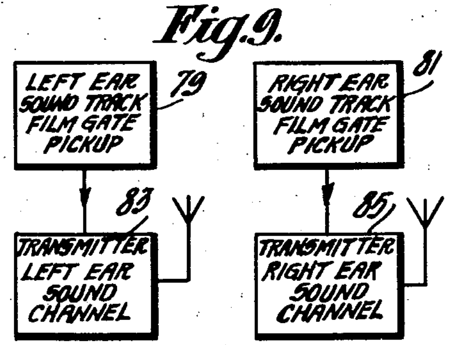
Figure 9 illustrates by block diagram one preferred form of sound pick-up and transmission system employed in the practice of one form of this invention.

Turning now to Figure 9, there is briefly illustrated in block diagram a means for maintaining the "ear-ness" of the stereosonic sound. The left ear sound track film gate pickup 79 and the right ear sound track film gate pickup 81 of Figure 9 may be associated with the corresponding left and right ear sound tracks of any of the film strip type shown in Figures 1, 4 and 5.

The left ear sound transcribed by pickup 79 is transmitted by separate channel to transmitter 83, and the sound transcribed by pickup 81 is transmitted through separate channel to transmitter 85.

Although these sound channels may optionally be consolidated on one carrier according to known methods with, for example, different subcarrier frequencies for the two separate sound signals, according to a preferred form of this invention a pulse-time modulation may be employed in such a manner that the "ear-ness" of the sound may be maintained by providing separate pulse transmission channels which are, for example, located in combination with the associated video signal.

Figure 10:
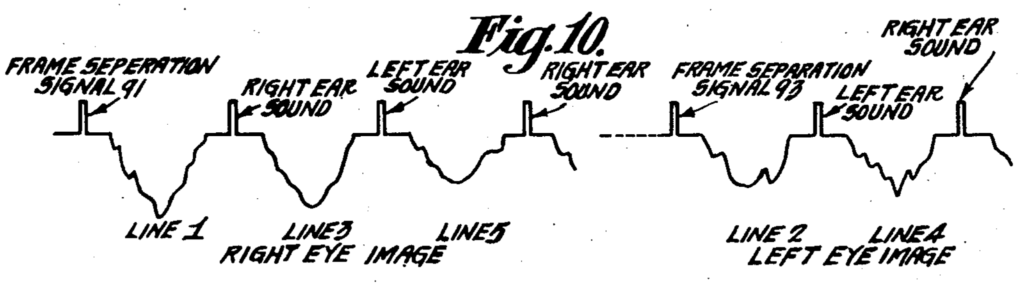
Figure 10 illustrates graphically a typical video signal employed in one preferred form of this invention.

According to Figure 10, there is illustrated a video signal wherein the sound transmission energy pulses are located on the pedestals or during the blanking period of the image signal.

It will be seen that following the frame separation signal 91, there is an image signal space alloted to line 1. During the blanking interval between line 1 and line 3, there is positioned a time modulated signal pulse representative of the right ear sound. Between line 3 and line 5 there is positioned a time modulated pulse signal representative of the left ear sound. Following line 5, a time modulated pulse representative of the right ear sound is illustrated.

It will be seen from the foregoing that the odd line scanning provides the right eye image. Continuing now to frame separation signal 93 which precedes even line scanning, it will be seen that between line 2 and line 4, a left ear sound pulse is illustrated. It will of course be necessary to adjust the system such that the right ear and the left ear sound pulses will always occur in alternate time intervals in order that proper phasing may be provided throughout the system and thus maintaining the proper "ear-ness" of the sound pickup, sound signal transmission, and sound reproduction.

Although some material has been published on time and pulse modulation, it is believed for the proper understanding of the operation of this form of the invention that a brief explanation of its operation is desirable.

Intelligence is transmitted through space by modulation of a signal carrier, for example, a radio frequency signal wave, transmission of the carrier, and demodulation of the carrier at the receiving station. Modulation is the process of altering a radio frequency signal wave in accordance with the intelligence to be transmitted.

A continuous radio frequency wave possesses three definite characteristics—amplitude, frequency, and phase. A signal is said to be frequency modulated when the amplitude of the signal carrier remains constant and the frequency of the carrier is modulated in accordance with the transmitted intelligence.

Instead of modulating a frequency of the carrier directly as is done in the conventional frequency modulation system, it is possible to make use of a subcarrier. For example, if a 1 mc. carrier is amplitude modulated at 100 kc. to provide a subcarrier, and the latter is frequency modulated, an indirect method of frequency modulation results.

A square wave subcarrier may be substituted for the sine wave subcarrier as a vehicle for the frequency modulated intelligence with but little difference in result, except for increased band width.

Frequency modulation of a comparatively low frequency square wave is accomplished easily. The system exhibits somewhat similar advantages as regards to noise reduction as does the conventional frequency modulation system.

The train of square waves may be considered as a series of rectangular pulses in which the pulse length is equal to the time between pulses. Now, if the pulses are shortened and the repetition rate maintained, the same average power may be considered to deliver a much greater effective signal strength. The frequency modulation of the pulses will result in a modulation of the timing of the pulses. Such a system is called pulse-time modulation. A pulse-time modulation type of signal representing associated sound has been combined with video signals to form a composite signal.

In order to maintain the "ear-ness" of the sound, it is, of course, necessary to provide to the receiving station two separate sound channels driving two separate loud speakers which are positioned to the right and the left respectively of the reproduced image. Depending upon the type of audio signal transmission, the two sound signal channels may be demodulated.

Figure 11:
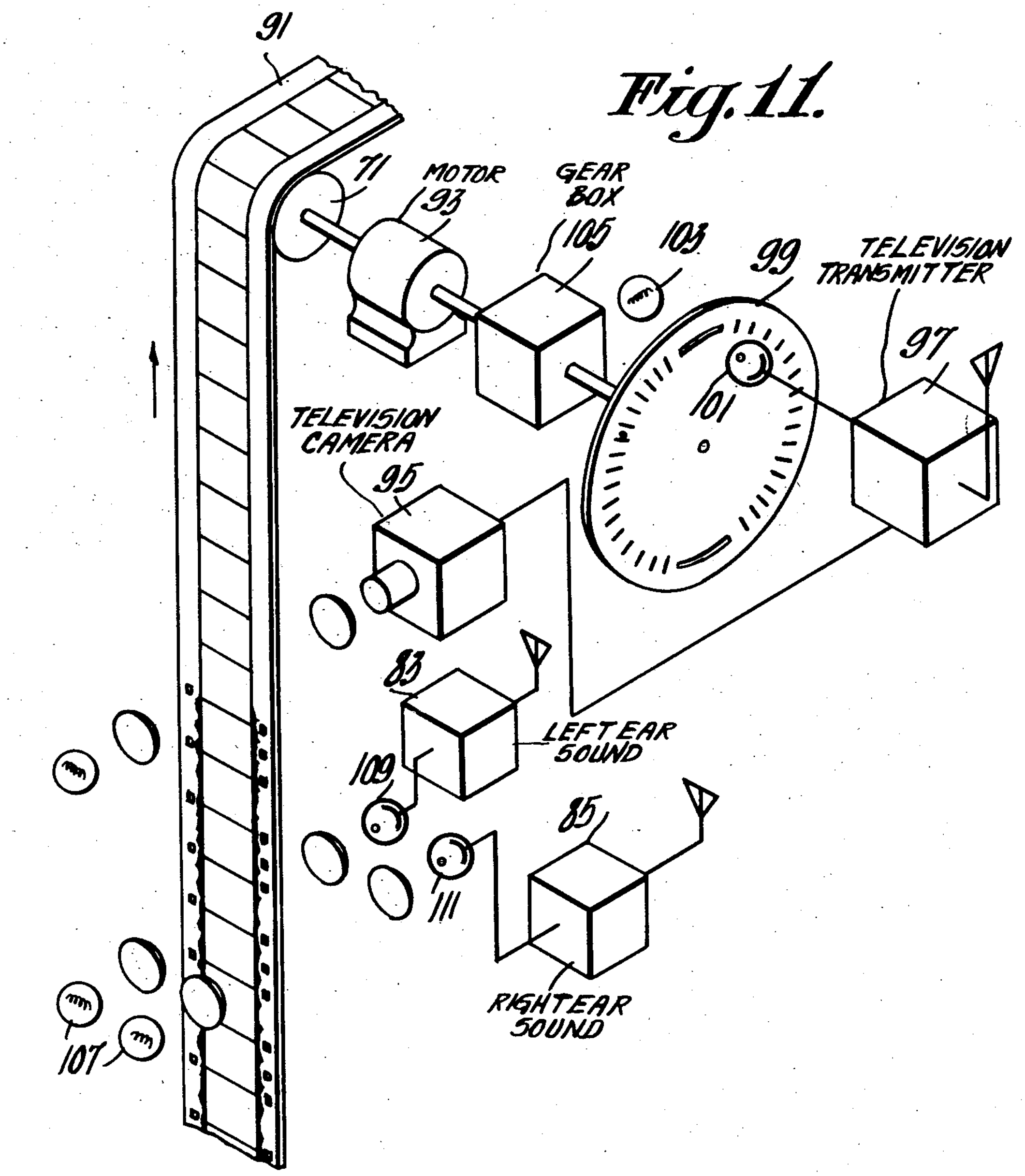
Figure 11 illustrates, by block diagram, one form of this invention.

Figure 11 shows, by block diagram an overall system including the elements shown in Figures 1 to 10 or their equivalents.

A film strip 91 is driven by sprocket 71 which is driven by a synchronous motor 93.

The film 91 is driven past television camera 95 which may take the form of the television pickup devices shown in Figures 6 and 7 or it may take the form of any of the popular cameras in use today in television broadcast service. The signal from the television camera 95 is transmitted by television transmitter 97 in the usual manner.

The synchronizing signal for television transmitter 97 is obtained, for purposes of illustration, through a mechanical disk 99. Synchronizing pulses are obtained in response of photocell 101 to the light 103 shining through the perforations in disk 99. A detailed discussion of this form of synchronizing device is shown and described in the patent to Ballard #2,152,234, issued March 24, 1939.

By mechanically coupling sprocket 71 and disk 99 and employing a proper gear ratio in gear box 105, it will be seen that an odd scanning field of interlaced scanning will always be representative of the same eye view. For example, if the mechanical arrangement is so timed the left eye view will always correspond to the odd field.

The sound pickup is obtained in response to light from lamp 107 shining on photocells 109 and 111 through their respective sound tracks. The sound energy may then be transmitted through transmitters 83 and 85 as suggested in the arrangement shown in Figure 9.

Having thus described the invention, what is claimed is:

1. A stereoscopic motion picture television system employing a film television camera of the interlaced scanning type and including a film strip having right eye and left eye images positioned alternately along said strip and each of said images representative of a series of cyclically repeated exposures, a series of holes positioned along said strip for engagement by a film strip drive sprocket, said holes being only partially regularly spaced along said strip to provide identification for said right eye and left eye images, said film strip drive sprocket having teeth being only partially regularly spaced around said sprocket to correspond to said holes positioned along said strip, a film gate associated with said camera, said sprocket positioned a predetermined distance from said gate to preserve the "eye-ness" of said images, a synchronizing signal generator, means for driving said sprocket and said generator in synchronism and means for transmitting the signal from said camera and a characteristic signal to insure proper phasing of odd line and even line scanning.

2. A stereoscopic motion picture television system comprising a television film pickup camera employing interlaced scanning and including a film strip having right eye and left eye images positioned alternately along said strip and each of said images representative of a series of cyclically repeated exposures, a series of holes positioned along said strip for engagement by a film strip drive mechanism, said holes being only partially regularly spaced along said strip to provide identification for said right eye and left eye images, a film strip drive sprocket having teeth being only partially regularly spaced around said sprocket to correspond to said holes positioned along said strip, a film gate associated with said camera and said sprocket, said sprocket positioned a predetermined distance from said gate to preserve the "eye-ness" of said images, an electrical switch whose operation is controlled in accordance with the speed of rotation of said sprocket, and means for separately transmitting video signals representative of each of said right and left eye images, said video signal transmitting means controlled by said electrical switch to maintain the "eye-ness" of said images.

3. A stereoscopic motion picture television system comprising a film pickup device employing interlaced scanning and including a film strip having right eye and left eye images positioned alternately along said strip and each of said images representative of a series of cyclically repeated exposures, a series of holes positioned along said strip for engagement by a film strip drive mechanism, said holes being only partially regularly spaced along said strip to provide identification for said right eye and left eye images, a film strip drive sprocket having teeth being only partially regularly spaced around said sprocket to correspond to said holes positioned along said strip, a film gate, said sprocket positioned a predetermined distance from said gate to preserve the "eye-ness" of said images, and an electrical synchronizing signal generator connected to control said interlaced scanning and whose operation is controlled in accordance with the speed of rotation of said sprocket.

4. A stereoscopic and stereosonic motion picture television system including a film camera employing a film strip having right eye and left eye images positioned alternately along said strip and each of said images representative of a series of schematically repeated exposures, a pair of sound tracks positioned along said strip and representative of stereosonic sound associated with said images, a series of holes positioned along said strip for engagement by a film strip drive mechanism, said holes being irregularly spaced along said strip to provide identification for said right eye and left eye images, a film strip drive sprocket having teeth being irregularly spaced around said sprocket to correspond to said holes positioned along said strip, said sprocket engaging said film, a pair of sound signal transmission channels adapted to transmit separately the sound from each of said pair of sound tracks to maintain the "ear-ness" of the stereosonic sound associated with said images, means to generate a scanning synchronizing signal, and means to drive said sprocket and said generator in synchronism.

5. A stereoscopic and stereosonic motion picture television system comprising an image pickup device, a film strip having right eye and left eye images positioned alternately along said strip and each of said images representative of a series of schematically repeated exposures, a pair of sound tracks positioned along said strip and representative of stereosonic sound associated with said images, a series of holes positioned along said strip for engagement by a film strip drive mechanism, said holes being only partially regularly spaced along said strip to provide identification for said right eye and left eye images, a film strip drive sprocket engaging said film and having teeth being only partially regularly spaced around said sprocket to correspond to said holes positioned along said strip, means for generating a synchronizing signal, means for synchronizing said sprocket and said generator, means for transmitting the signal derived from said camera and said generator, and a pair of sound signal transmission channels adapted to transmit separately the sound from each of said pair of sound tracks to maintain the "ear-ness" of the stereosonic sound associated with said images, said sound channels including means for time modulating a series of cyclically repeated energy pulses associated with the video signal representative of said images.

ALFRED N. GOLDSMITH.

(References on following page)

REFERENCES CITED

The following references are of record in the file of this patent:

UNITED STATES PATENTS

| Number | Name | Date |
|---|---|---|
| 1,236,639 | Williams | Aug. 14, 1917 |
| 1,255,288 | Brixey | Feb. 5, 1918 |
| 1,944,182 | Jones | Jan. 23, 1934 |
| 1,988,931 | Alexanderson | Jan. 22, 1935 |
| 2,107,464 | Zevorykin | Feb. 8, 1935 |
| 2,171,536 | Bingley | Sept. 5, 1939 |
| 2,209,747 | Eisler | July 30, 1940 |
| 2,301,254 | Carnahan | Nov. 10, 1942 |
| 2,365,212 | Oriol | Dec. 19, 1944 |
| 2,417,446 | Reynolds | Mar. 18, 1947 |

FOREIGN PATENTS

| Number | Country | Date |
|---|---|---|
| 223,476 | Great Britain | Oct. 23, 1924 |
| 325,362 | Great Britain | Nov. 13, 1929 |
| 522,163 | Great Britain | June 11, 1940 |
| 562,870 | Great Britain | Nov. 21, 1923 |
| 571,061 | Great Britain | Aug. 3, 1945 |
| 571,944 | Great Britain | Sept. 17, 1945 |
| 571,945 | Great Britain | Sept. 17, 1945 |
| 571,946 | Great Britain | Sept. 17, 1945 |